US010146452B2

United States Patent
Ash et al.

(10) Patent No.: US 10,146,452 B2
(45) Date of Patent: Dec. 4, 2018

(54) MAINTAINING INTELLIGENT WRITE ORDERING WITH ASYNCHRONOUS DATA REPLICATION

(71) Applicant: International Business Machines Corporation, Armonk, NY (US)

(72) Inventors: Kevin J. Ash, Tucson, AZ (US); Matthew J. Kalos, Tucson, AZ (US); Brian A. Rinaldi, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 15/136,136

(22) Filed: Apr. 22, 2016

(65) Prior Publication Data

US 2017/0308308 A1 Oct. 26, 2017

(51) Int. Cl.
*G06F 3/06* (2006.01)
*G06F 12/0804* (2016.01)
*G06F 12/0868* (2016.01)

(52) U.S. Cl.
CPC .......... *G06F 3/0619* (2013.01); *G06F 3/065* (2013.01); *G06F 3/0665* (2013.01); *G06F 3/0689* (2013.01); *G06F 12/0804* (2013.01); *G06F 12/0868* (2013.01); *G06F 2212/1016* (2013.01); *G06F 2212/313* (2013.01)

(58) Field of Classification Search
CPC .. G06F 2212/69; G06F 12/128; G06F 3/0689; G06F 3/0665; G06F 3/065; G06F 3/0619
See application file for complete search history.

(56) References Cited

U.S. PATENT DOCUMENTS

| 2002/0035666 | A1 | 3/2002 | Beardsley et al. |
| 2003/0158869 | A1* | 8/2003 | Micka ................. G06F 11/2074 |
| 2005/0071588 | A1* | 3/2005 | Spear .................. G06F 11/2064 |
| | | | 711/162 |
| 2012/0239857 | A1 | 9/2012 | Jibbe et al. |

OTHER PUBLICATIONS

Gill, Binny, et al., "WOW:Wise Ordering for Writes—Combining Spatial and Temporal Locality in Non-Volatile Caches," 4th USENIX Conference on File and Storage Technologies, 2005.

* cited by examiner

*Primary Examiner* — Larry T Mackall
(74) *Attorney, Agent, or Firm* — Nelson and Nelson; Daniel P. Nelson; Alexis V. Nelson

(57) ABSTRACT

A method for maintaining intelligent write ordering in an asynchronous data replication system is disclosed. In one embodiment, such a method includes performing the following, in order, for each extent of each rank of the primary storage device: (1) determining which primary volume the extent is associated with on the primary storage device; (2) if the primary volume that is associated with the extent is in a mirroring relationship with a corresponding secondary volume on the secondary storage device, scanning an out-of sync bitmap associated with the primary volume; and (3) sending, from the primary volume to the secondary volume, tracks in the extent having corresponding bits set in the out-of sync bitmap. A corresponding system and computer program product are also disclosed.

20 Claims, 5 Drawing Sheets

MAINTAINING INTELLIGENT WRITE ORDERING WITH ASYNCHRONOUS DATA REPLICATION

BACKGROUND

Field of the Invention

This invention relates to systems and methods for maintaining intelligent write ordering in asynchronous data replication environments.

Background of the Invention

Storage systems such as the IBM DS8000™ enterprise storage system may utilize a cache algorithm known as Intelligent Write Caching (IWC). This algorithm may improve performance by better managing the write cache and improving the order in which writes are destaged from the write cache to spinning disk drives. In general, this algorithm may reduce seek and rotational penalties for spinning disk drives and also improve RAID parity generation by allowing some parity operations to be performed as a group.

Unfortunately, performance improvements of Intelligent Write Caching may be lost or impaired when asynchronously mirroring data between storage systems, particularly with certain types of workloads. For example, certain types of workloads in asynchronous data replication systems may alter the order in which writes are destaged from the write cache using Intelligent Write Caching. This can impair performance by increasing the amount or percentage of time spent seeking for write locations on the disk drives.

For example, when mirroring data from a primary storage device to a secondary storage device in an asynchronous data replication system, writes may be stored in the write cache of the secondary storage device. This can cause problems where previous versions of data that are being overwritten belong to a previous consistency group. In such cases, the previous versions of the data in the secondary write cache may need to be preserved prior to writing the new data. This causes the prior version of the data be destaged from the secondary write cache prior to writing the new data, thereby altering the order that data would normally be destaged from the secondary write cache using the Intelligent Write Caching algorithm. As mentioned above, this can impair performance by increasing the amount or percentage of time spent seeking for write locations on spinning disk drives.

In view of the foregoing, what are needed are systems and methods to maintain intelligent write ordering in asynchronous data replication environments. Ideally, such systems and methods will improve the order in which writes are destaged to disk from the secondary write cache.

SUMMARY

The invention has been developed in response to the present state of the art and, in particular, in response to the problems and needs in the art that have not yet been fully solved by currently available systems and methods. Accordingly, the invention has been developed to provide systems and methods for maintaining intelligent write ordering in asynchronous data replication environments. The features and advantages of the invention will become more fully apparent from the following description and appended claims, or may be learned by practice of the invention as set forth hereinafter.

Consistent with the foregoing, a method for maintaining intelligent write ordering in an asynchronous data replication system is disclosed herein. In one embodiment, such a method includes performing the following, in order, for each extent of each rank of the primary storage device: (1) determining which primary volume the extent is associated with on the primary storage device; (2) if the primary volume that is associated with the extent is in a mirroring relationship with a corresponding secondary volume on the secondary storage device, scanning an out-of sync bitmap associated with the primary volume; and (3) sending, from the primary volume to the secondary volume, tracks in the extent having corresponding bits set in the out-of sync bitmap.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
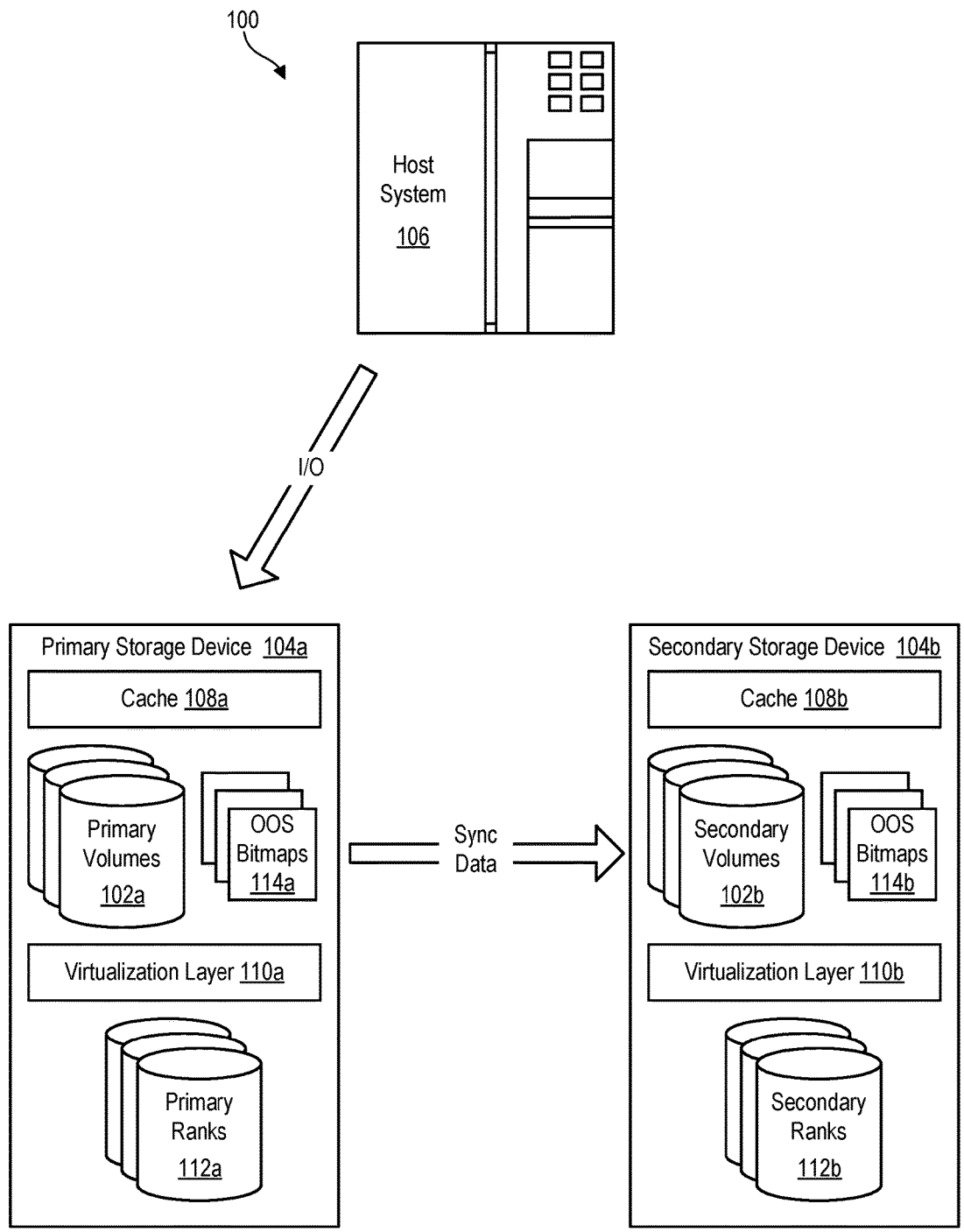
FIG. 1 is a high-level block diagram showing one example of an asynchronous data replication system in which a method in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Referring to FIG. 1, one example of a data replication system 100, in this embodiment an asynchronous data replication system 100, is illustrated. The asynchronous data replication system 100 is presented to show an example of an architecture in which embodiments of the invention may operate, and is not intended to be limiting. In general, the asynchronous data replication system 100 establishes a mirroring relationship between one or more primary logical volumes 102a and one or more secondary logical volumes 102b. Once this relationship is established, a consistent copy of data is maintained on the logical volumes 102a, 102b. The primary and secondary logical volumes 102a, 102b may be located on the same storage device 104, although the logical volumes 102a, 102b are typically located on separate storage devices 104a, 104b located some distance (e.g., several miles to thousands of miles) from one another. Channel extension equipment may be located between the storage devices 104a, 104b, as needed, to extend the distance over which the storage devices 104a, 104b may communicate.

As alluded to above, the asynchronous data replication system 100 may be configured to operate in an asynchronous manner. Asynchronous operation may only require that a write complete on the primary storage device 104a before the write is considered complete. As an example, in such a configuration, a host system 106 may initially send a write request to the primary storage device 104a. This write operation may be executed on the primary storage device 104a. A write acknowledgement may then be returned to the host system 106 when the write has completed on the primary storage device 104a, without requiring that the write also complete on the secondary storage device 104b. The write may then be asynchronously mirrored to the secondary storage device 104b as time and resources allow to create a consistent copy of the data on the secondary storage device 104b.

As shown in FIG. 1, in certain embodiments, the primary storage device 104a may keep track of which storage elements (e.g., tracks) need to be mirrored to the secondary storage device 104b using one or more primary out-of sync bitmaps 114a. In certain embodiments, a primary out-of sync bitmap 114a may be maintained for each primary logical volume 102a. The primary out-of sync bitmap 114a may include a bit for each storage element in the primary logical volume 102a. Setting a bit in the primary out-of sync bitmap 114a may indicate that the corresponding storage element in the primary logical volume 102a has been updated and needs to be mirrored to the secondary storage device 104b.

When a consistency group is created on the primary storage device 104a, the storage elements identified in the primary out-of sync bitmap 114a may be mirrored to the secondary storage device 104b and the corresponding bits may be reset in the primary out-of sync bitmap 114a. The secondary storage device 104b may also include out-of sync bitmaps 114b to indicate which storage elements need to be mirrored from the secondary storage device 104b to the primary storage device 104a. These out-of sync bitmaps 114b come into play after a failover has occurred and data is being directly written to the secondary storage device 104b. Such a scenario is beyond the scope of the invention and will not be discussed herein.

As shown in FIG. 1, the logical volumes 102 in the primary storage device 104a and secondary storage device 104b may be implemented all or in part on underlying physical storage drives 112, such as spinning disk drives 112 (hereinafter referred to as ranks 112). A logical volume 102 may be implemented within a single rank 112 or spread across multiple ranks 112. Similarly, a rank 112 may store data associated with a single logical volume 102 or data associated with multiple logical volumes 102. A virtualization layer 110 within the storage device 104 may handle the mapping between the logical volumes 102 and the ranks 112. To external accessing systems (e.g., the host system 106), the virtualization layer 110 may present the logical volumes 102 as single usable storage entities while hiding the underlying configuration of the physical storage space and storage drives behind the logical volumes 102. The manner in which data and/or storage space of logical volumes 102 may be distributed across ranks 112 will be discussed in more detail in association with FIG. 3.

As further shown in FIG. 1, each of the primary storage device 104a and secondary storage device 104b may include cache 108a, 108b. Whenever a storage device 104 receives a read request from a host system 106, the storage device 104 may first check its cache 108 to determine whether the requested data is stored therein. If so, the storage device 104 may retrieve the data from its cache 108 and return it to the host system 106. If the data is not stored in its cache 108, the storage device 104 may fetch the data from its volumes 102, return the data to the host system 106, and save it in its cache 108 in the event it is requested again. If the data is requested again by a host 106, the storage device 104 may fetch the data from its cache 108 instead of fetching it from its volumes 102, saving both time and resources.

In a similar manner, when a storage device 104 receives a write request, the storage device 104 may store the write in its cache 108 and destage the write to its volumes 102 at a later time. The write may be considered complete when it is written to its cache 108 as opposed to when it is destaged to its volumes 102. In general, the cache 108 may accelerate reads and writes and generally enhance I/O performance.

As previously mentioned, storage systems 104 such as the IBM DS8000™ enterprise storage system 104 may utilize a cache algorithm known as Intelligent Write Caching (IWC). This algorithm may improve performance by better managing the cache 108 (hereinafter referred as the write cache 108) and improving the order in which writes are destaged from the write cache 108 to spinning disk drives 112. In general, this algorithm may reduce seek and rotational penalties for spinning disk drives 112 and also improve RAID parity generation by allowing some parity operations to be performed as a group.

Unfortunately, the performance improvements of Intelligent Write Caching may be lost or impaired when asynchronously mirroring data between storage systems 104a, 104b, particularly with certain types of workloads. For example, certain types of workloads may alter the order in which writes are destaged from the write cache 108 using the Intelligent Write Caching algorithm. This can impair performance by increasing the amount and/or percentage of time spent seeking for write locations on the disk drives 112.

For example, when mirroring data from a primary storage device 104a to a secondary storage device 104b in an asynchronous data replication system 100, writes may be stored in the write cache 108b of the secondary storage device 104b. This can cause problems when previous versions of data that are being overwritten belong to a previous consistency group. In such cases, the previous versions of the data in the secondary write cache 108b may need to be preserved prior to writing the new data. This causes the prior version of the data to be destaged from the secondary write cache 108b prior to writing the new data, thereby altering the order that data would normally be destaged from the secondary write cache using Intelligent Write Caching. As mentioned above, this can impair performance by increasing the amount and/or percentage of time spent seeking for write locations on spinning disk drives 112b.

Figure 2:
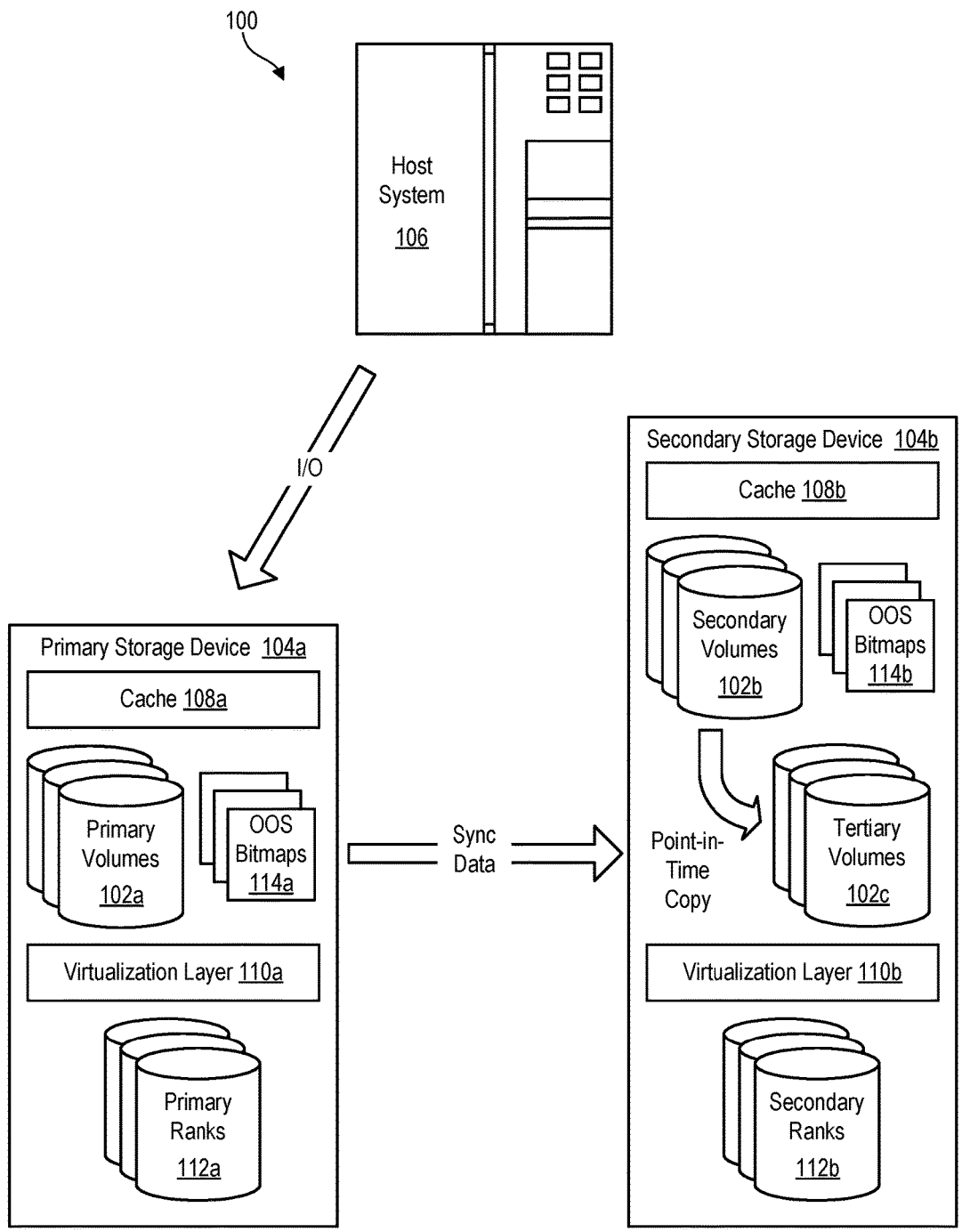
FIG. 2 is a high-level block diagram showing another example of an asynchronous data replication system in which a method in accordance with the invention may be implemented.

FIG. 2 shows one example of a scenario where the write destage order may be altered from what would normally occur using Intelligent Write Caching. As shown, at the secondary storage device 104b, once a consistency group is formed in the secondary volumes 102b, a point-in-time copy may be made (using FlashCopy or another suitable function) of data in the secondary volumes 102b. This data may be stored in tertiary volumes 102c. Some data that belongs to the point-in-time copy in the tertiary volumes 102c may be stored in the secondary write cache 108b. When a write is mirrored from the primary storage device 104a to the secondary storage device 104b, this write may displace the prior version of the data in the secondary write cache 108b, thereby prematurely destaging it to the tertiary volumes 102c. In other words, such a scenario may alter the destage order that would normally occur using Intelligent Write Caching. This, in turn, may cause additional seeking and associated inefficiencies on the underlying disk drives 112b.

Figure 3:
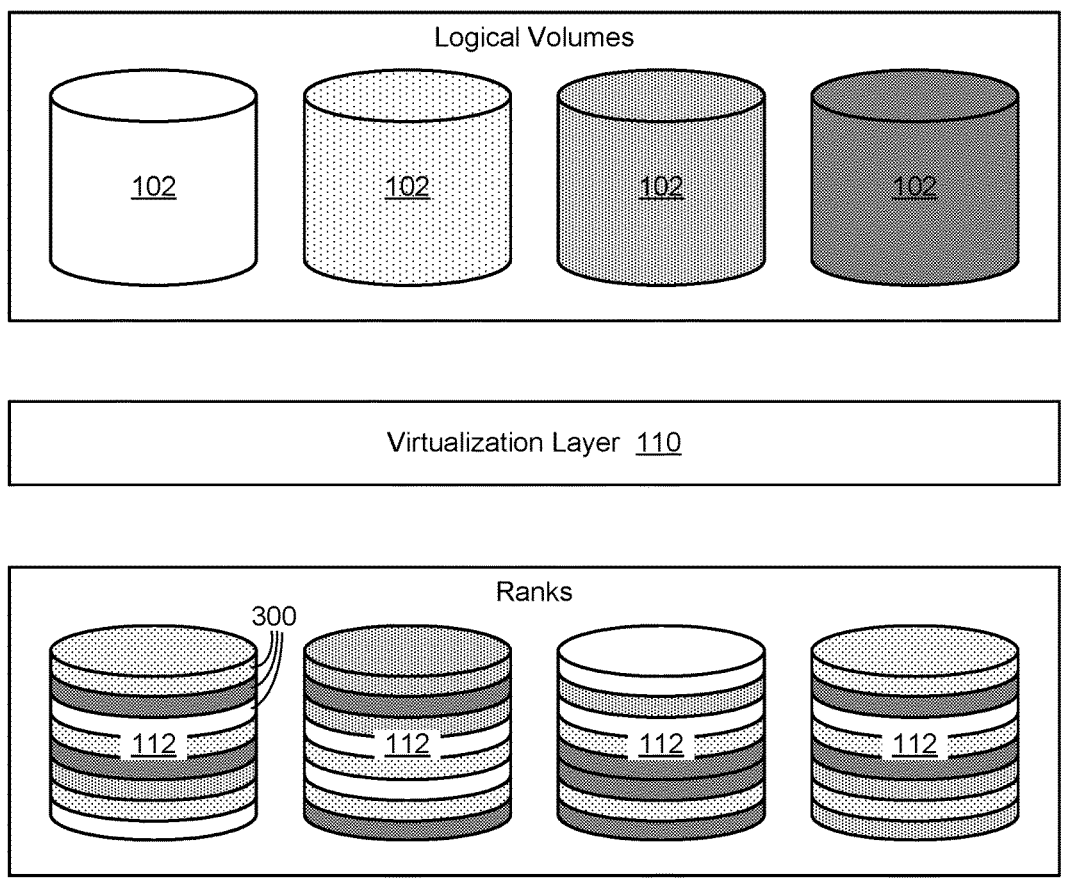
FIG. 3 is a high-level block diagram showing how extents from various logical volumes may be distributed across ranks (i.e., disk drives) of a storage system.

FIG. 3 shows how data and/or storage space from various logical volumes 102 may be distributed across ranks 112 (i.e., hard disk drives and/or arrays thereof) of a storage system 104. As shown in FIG. 3, physical storage may be allocated to logical volumes 102 in storage units referred to as "extents." In one embodiment, an extent is a 1 GB block of storage space, although an extent is not limited to any particular size. An extent may be divided into smaller storage elements referred to herein as "tracks." The extents for a given logical volume 102 are typically rotated between ranks 112 to enable the logical volume 102 to take advantage of the performance of the multiple ranks 112. Adjacent extents on a rank 112 may be (and typically will be)

associated with different logical volumes 102 and different offsets within the logical volumes 102. A virtualization layer 110 may handle the mapping between the logical volumes 102 and the extents 300 of the ranks 112. The ranks 112 illustrated in FIG. 3 are divided into extents 300 for illustration purposes, and the extents 300 are shaded to show which logical volume 102 they correspond to, also for illustration purposes. In reality, a rank 112 may include many more extents 300 than what is illustrated.

Figure 4:
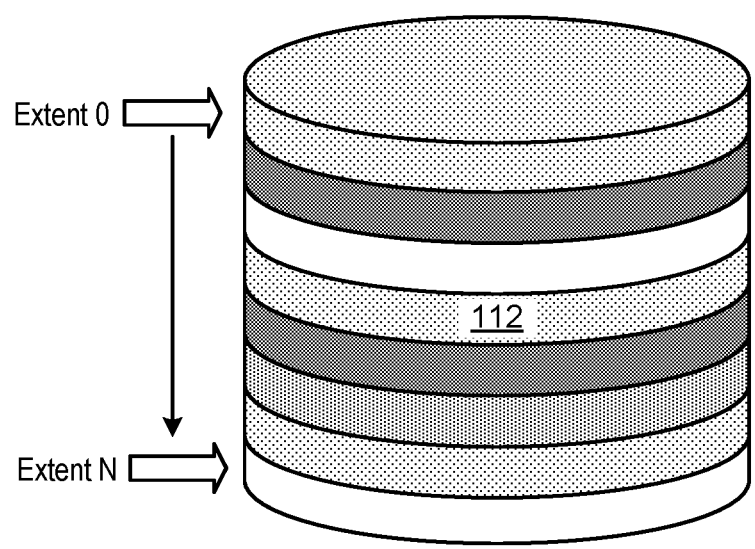
FIG. 4 is a high-level block diagram showing how a method in accordance with the invention may be performed for each extent of each rank of the primary storage device.

Referring to FIG. 4, in conventional asynchronous data replication systems 100, data is duplicated from a primary storage device 104a to a secondary storage device 104b using a volume-based approach. That is, the asynchronous data replication system 100 may replicate data from a first primary logical volume 102a, then from a second primary logical volume 102a, then from a third primary logical volume 102a, and so forth. Because of the way that extents 300 of logical volumes 102 are distributed across ranks 112, replicating a primary logical volume 102a from the primary storage device 104a to the secondary storage device 104b may include locating the primary logical volume's extents 300 on the ranks 112a and copying the updated data in these extents 300 (as indicated in the out-of sync bitmap 114 associated with the primary logical volume 102a) to the associated secondary logical volume 102b. This can involve a significant amount of seeking on the underlying hard disk drives 112a as the primary logical volume's extents 300 may be distributed across the ranks 112a in an intermittent and discontinuous manner. When replicating data to the write cache 108 of the secondary storage device 104b using this volume-based approach, data in the write cache 108 may be synchronously destaged in a manner that causes excessive seeking and inefficiencies on the secondary ranks 112b.

To reduce inefficiencies associated with the volume-based approach for replicating data, methods in accordance with the invention may instead use an extent-based approach to replicating data from a primary logical volume 102a to a secondary logical volume 102b. In general, this extent-based approach may replicate data from a primary storage device 104a to a secondary storage device 104b in order of rank 112 and extent 300 on the rank 112 as opposed to by logical volume 102. For example, as shown in FIG. 4, the improved methodology may select a rank 112 and process the extents 300 of the rank 112 in order, starting with the first extent 300 (i.e., Extent 0) of the rank 112, and continuing on to the last extent 300 (i.e., Extent N) of the rank 112. This process will be explained in more detail in association with FIG. 5. Using this improved methodology, seeking on the underlying ranks 112 may be reduced. This improved methodology may be particularly efficient with sparsely populated out-of sync bitmaps 114 (out-of sync bitmaps 114 having a sparse number of bits set) since such out-of sync bitmaps 114 may normally be associated with a significant amount of seeking on the underlying ranks 112.

Figure 5:
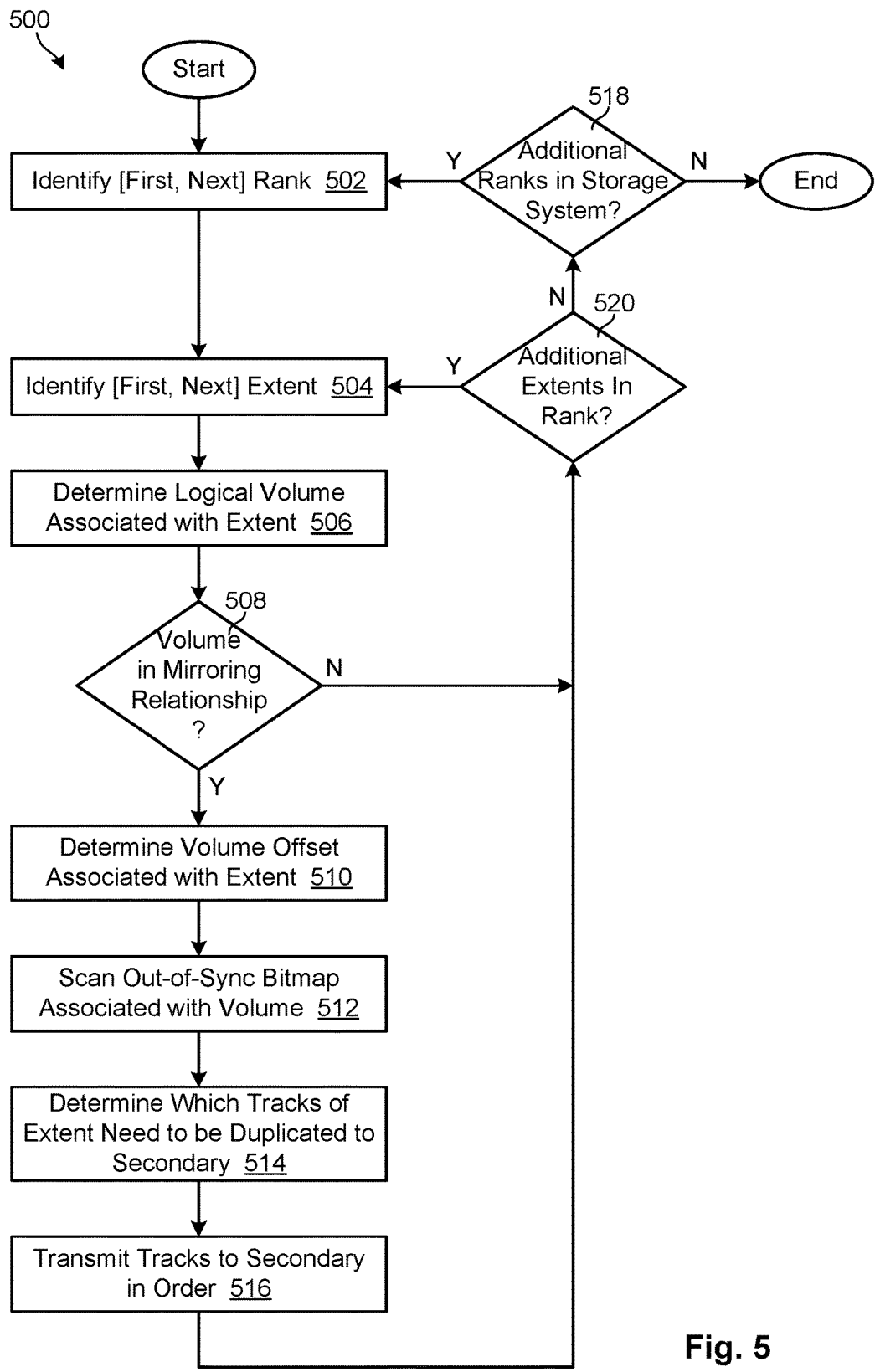
FIG. 5 is a flow diagram showing one embodiment of a method for maintaining intelligent write ordering in an asynchronous data replication system.

Referring to FIG. 5, one embodiment of a method 500 for maintaining intelligent write ordering in an asynchronous data replication system 100 is illustrated. Such a method 500 uses an extent-based approach, as opposed to a volume-based approach, to replicate data in an asynchronous data replication system 100. As shown, the method 500 initially identifies 502 a first rank 112a of the primary storage device 104a, and identifies 504 a first extent 300 of the first rank 112a. The method 500 then determines 506 the logical volume 102 on the primary storage device 104a that is associated with the extent 300.

The method 500 then determines 508 whether the logical volume 102 is in a mirroring relationship with a corresponding logical volume 102b on the secondary storage device 104b. If not, there is no need to replicate data in the extent 300 and the method 500 moves on to analyze other extents 300 and/or ranks 112. If the logical volume 102 is in a mirroring relationship with a corresponding logical volume 102b, the method 500 determines 510 a volume offset associated with the extent 300 (i.e., identifies 510 where the extent 300 is located within the logical volume 102a) and scans 512 an out-of sync bitmap 114a associated with the logical volume 102a to determine which bits are set. The method 500 analyzes the bits to determine 514 which tracks of the extent 300 need to be duplicated to the secondary logical volume 102b. The method 500 then transmits 516 the tracks to the secondary storage device 104b in order (e.g., in the order the tracks are stored in the extent 300).

The method 500 then determines 520 if there are additional extents 300 in the rank 112a. If so, the method 500 identifies the next extent 300 (e.g., the next adjacent extent 300) in the rank 112a and repeats the steps previously discussed for this extent 300. If the method 500 has reached the last extent 300 in the rank 112 (meaning there are no additional extents 300 in the rank 112), the method 500 determines 518 whether there are additional ranks 112a in the primary storage device 104a to process. If so, the method 500 identifies 502 the next rank 112 and identifies 504 the first extent 300 in the rank 112a. The method 500 then analyzes the extents 300 in this rank 112a in the manner previously described. The method 500 continues this process until it analyzes all extents 300 of all ranks 112a of the primary storage device 104a and, if required, replicates the extents 300 to the secondary storage device 104b.

In certain embodiments, the improved extent-based approach described in FIG. 5 is used in place of the conventional volume-based approach discussed herein. In other embodiments, the volume-based approach is used after the extent-based approach to determine whether the extent-based approach missed any logical volumes 102a, ranks 112a, and/or extents 300 that needed to be replicated to the secondary storage device 104b. For example, after the extent-based approach has completed, the volume-based approach may scan the out-of sync bitmaps 114 to determine if there are any remaining bits (and associated work) that were missed by the extent-based approach. It is contemplated that work may be missed if extents 300 are being migrating during execution of the extent-based approach. Thus, the volume-based approach may be used to verify that the extent-based approach discovered all work that needed to be performed.

In other embodiments, the extent-based approach is only used under certain conditions or for certain workloads. For example, the extent-based approach may be used where primary out-of sync bitmaps 114a are sparsely populated (i.e., include few set bits) and/or where a destage rate from the secondary write cache 108b exceeds a specified threshold. Absent these conditions, the conventional volume-based approach may be used. In other cases, the volume-based approach may be used if the extent-based approach misses too much work (indicating that the extent-based approach may not be working or may be wasting time). In certain embodiments, an option may be provided to a system administrator to never use the extent-based approach, always use the extent-based approach, and/or sometimes use the extent-based approach. The system administrator may also specify criteria/conditions when to use the extent-based approach and/or the volume-based approach.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for maintaining intelligent write ordering in an asynchronous data replication system comprising a primary storage device and a secondary storage device, the method comprising:
   identifying a plurality of extents in a plurality of ranks of a primary storage device; and
   performing the following, in order, for each extent of each rank of the primary storage device:
      determining which primary logical volume on the primary storage device is associated with the extent;
      if the primary logical volume that is associated with the extent is in a mirroring relationship with a corresponding secondary logical volume on a secondary storage device, scanning an out-of sync bitmap associated with the primary logical volume; and
      sending, from the primary logical volume to the secondary logical volume, tracks in the extent having corresponding bits set in the out-of sync bitmap.

2. The method of claim 1, wherein performing the following comprises performing the following if a write cache destage rate associated with the secondary storage device exceeds a specified threshold.

3. The method of claim 1, wherein determining which primary logical volume on the primary storage device is associated with the extent further comprises determining which offset within the primary logical volume is associated with the extent.

4. The method of claim 1, wherein performing the following comprises performing the following depending on the density of bits set in the out-of sync bitmap.

5. The method of claim 1, wherein sending tracks in the extent having corresponding bits set in the out-of sync bitmap comprises sending the tracks in order.

6. The method of claim 1, wherein performing the following comprises performing the following after a consistency group is formed on the primary storage device.

7. The method of claim 1, wherein performing the following, in order, for each extent of each rank comprises performing the following starting at a first extent of the rank and proceeding in order from adjacent extent to adjacent extent to the last extent of the rank.

8. A computer program product for maintaining intelligent write ordering in an asynchronous data replication system comprising a primary storage device and a secondary storage device, the computer program product comprising a computer-readable storage medium having computer-usable program code embodied therein, the computer-usable program code comprising:

computer-usable program code to identify a plurality of extents in a plurality of ranks of a primary storage device; and
computer-usable program code to perform the following, in order, for each extent of each rank of the primary storage device:
   determine which primary logical volume on the primary storage device is associated with the extent;
   if the primary logical volume that is associated with the extent is in a mirroring relationship with a corresponding secondary logical volume on a secondary storage device, scan an out-of sync bitmap associated with the primary logical volume; and
   send, from the primary logical volume to the secondary logical volume, tracks in the extent having corresponding bits set in the out-of sync bitmap.

9. The computer program product of claim 8, wherein performing the following comprises performing the following if a write cache destage rate associated with the secondary storage device exceeds a specified threshold.

10. The computer program product of claim 8, wherein determining which primary logical volume on the primary storage device is associated with the extent further comprises determining which offset within the primary logical volume is associated with the extent.

11. The computer program product of claim 8, wherein performing the following comprises performing the following depending on the density of bits set in the out-of sync bitmap.

12. The computer program product of claim 8, wherein sending tracks in the extent having corresponding bits set in the out-of sync bitmap comprises sending the tracks in order.

13. The computer program product of claim 8, wherein performing the following comprises performing the following after a consistency group is formed on the primary storage device.

14. The computer program product of claim 8, wherein performing the following, in order, for each extent of each rank comprises performing the following starting at a first extent of the rank and proceeding in order from adjacent extent to adjacent extent to the last extent of the rank.

15. A system for maintaining intelligent write ordering in an asynchronous data replication system comprising a primary storage device and a secondary storage device, the system comprising:
   at least one processor;
   at least one memory device operably coupled to the at least one processor and storing instructions for execution on the at least one processor, the instructions causing the at least one processor to:
      identify a plurality of extents in a plurality of ranks of a primary storage device; and
      perform the following, in order, for each extent of each rank of the primary storage device:
         determine which primary logical volume on the primary storage device is associated with the extent;
         if the primary logical volume that is associated with the extent is in a mirroring relationship with a corresponding secondary logical volume on a secondary storage device, scan an out-of sync bitmap associated with the primary logical volume; and
         send, from the primary logical volume to the secondary logical volume, tracks in the extent having corresponding bits set in the out-of sync bitmap.

16. The system of claim 15, wherein performing the following comprises performing the following if a write cache destage rate associated with the secondary storage device exceeds a specified threshold.

17. The system of claim 15, wherein determining which primary logical volume on the primary storage device is associated with the extent further comprises determining which offset within the primary logical volume is associated with the extent.

18. The system of claim 15, wherein performing the following comprises performing the following depending on the density of bits set in the out-of sync bitmap.

19. The system of claim 15, wherein sending tracks in the extent having corresponding bits set in the out-of sync bitmap comprises sending the tracks in order.

20. The system of claim 15, wherein performing the following comprises performing the following after a consistency group is formed on the primary storage device.

* * * * *